Feb. 17, 1942. H. MURTAGH ET AL 2,273,803
BEARING FOR SENSITIVE INSTRUMENTS
Filed Dec. 19, 1939 3 Sheets-Sheet 2
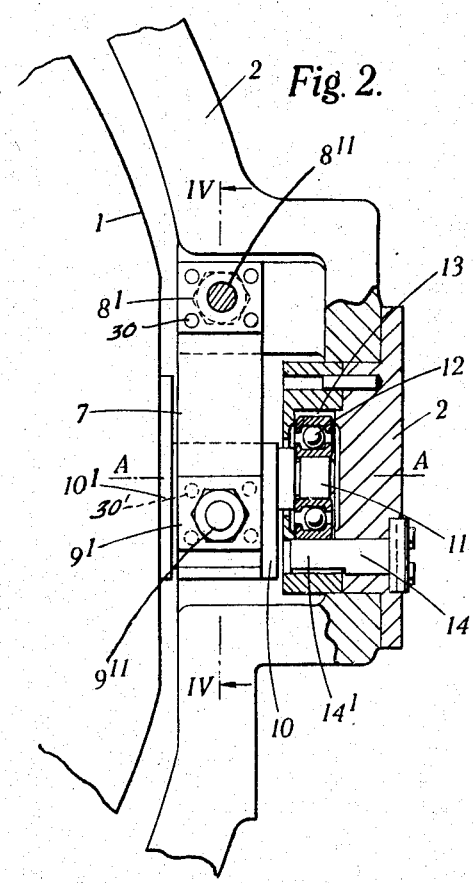
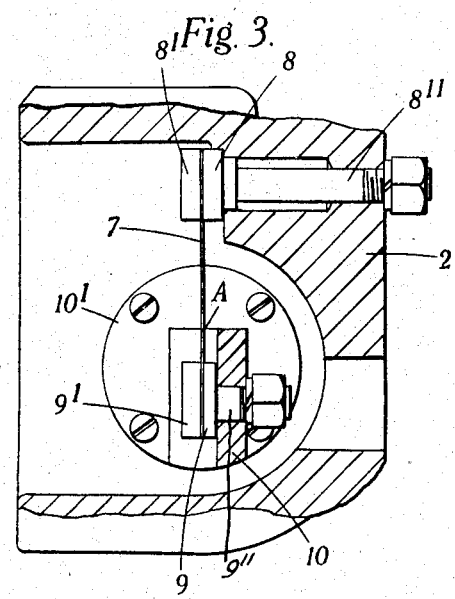
INVENTORS
HUGH MURTAGH
and WILLIAM GEORGE HARDING
by
Herbert H. Thompson
Attorney

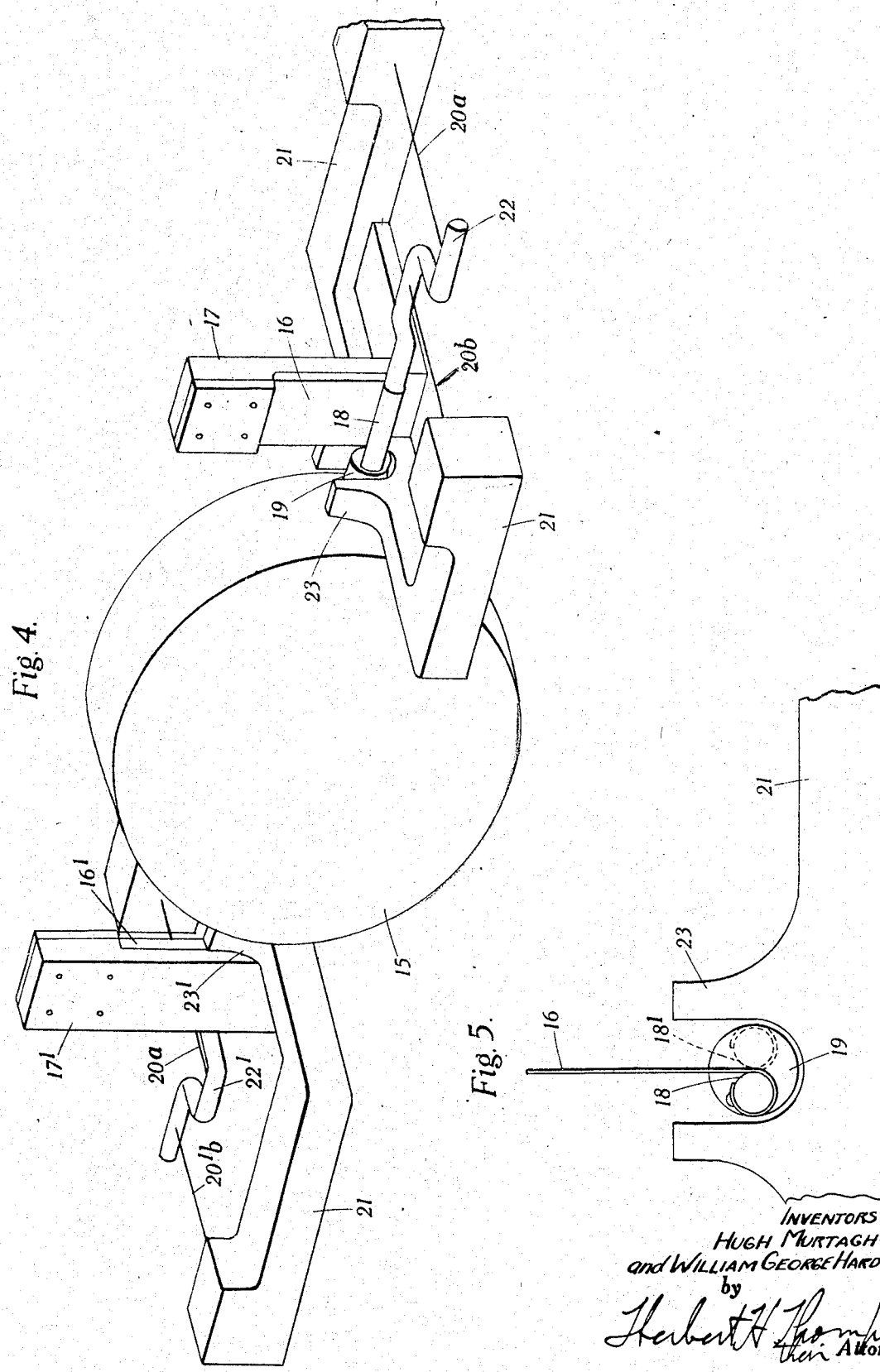

Patented Feb. 17, 1942

2,273,803

UNITED STATES PATENT OFFICE 2,273,803

BEARING FOR SENSITIVE INSTRUMENTS

Hugh Murtagh, Laleham-on-Thames, and William George Harding, Whitton, England, assignors to Sperry Gyroscope Company Incorporated, Brooklyn, N. Y., a company of New York Application December 19, 1939, Serial No. 309,944
In Great Britain December 21, 1938

10 Claims. (Cl. 248—358)

This invention relates to bearings for sensitive indicating instruments or controlling devices, such as gyroscopes.

The invention contemplates the use, as bearings, of steel blades or leaves arranged for transverse flexure and rigidly clamped at one end to the supported member and at the other end to the support. When applied to the support of the rotor case of a gyroscope with freedom to tilt about a horizontal axis in a vertical Cardan ring, each bearing may comprise a single steel blade extending between fixtures respectively on the rotor case and Cardan ring, to which fixtures the respective ends of the steel blade are rigidly clamped. In such an arrangement, e. g. in a gyro-compass, the rotor case is free to move bodily in relation to the Cardan ring during swing of the compass in its gimbals or during handling and such movement tends to upset the balance of the compass about the axis of support of the Cardan ring and thus give rise to excessive frictional torques causing errors of the compass. Moreover the blades are subjected to strains tending to distort them or to fatigue the metal of which they are made, thus finally leading to breakage.

An object of the invention is inter alia to overcome this defect in such an arrangement, and with this end in view the invention consists in a bearing for a member having limited freedom for rotational movement in relation to its support, comprising flexural elastic means extending between the support and the supported member, and means providing constraint against relative movements other than the desired rotational movements about a prearranged axis, between the supported member and the support.

Preferably the blades or filaments, and the associated means for applying the additional constraint, form two groups spaced apart in a direction parallel to the axis of rotation of the supported member, so that the two groups are equivalent to two spaced bearings. When the invention is applied to the support of a gyroscope rotor casing the blades may be each rigidly clamped at one end to a fixture on the Cardan ring, and at the other end either clamped directly in a fixture on the rotor case or make tangential contact with a curved surface on such a fixture, to which it is clamped or secured after extending for some distance round said curved surface. The Cardan ring, or a supporting structure therefor, is preferably itself universally mounted, e. g. in gimbals, so that even in the absence of the rotor and rotor case it is either pendulous or at least in neutral equilibrium.

The additional constraints provided are of such a nature as to cause no restriction to the freedom of the rotor case to tilt about the desired axis of rotation in the Cardan ring.

The invention further consists in a method of mounting a gyroscope or part thereof with freedom for rotational movement in relation to its support wherein the gyroscope or part thereof is suspended by flexural elastic means, e. g. blades, and balanced for movement about its natural axis of tilt, as defined herein.

The invention also consists in a mounting for a sensitive element in a gyroscope mounted with freedom to precess about two mutually perpendicular axes comprising flexural elastic means such as blades whereby the sensitive element is supported.

The invention will be clearly understood from the following description of two forms (given, however, merely by way of example) which it may assume, and this description will be more readily followed by reference to the accompanying drawings wherein Figure 1 is a front elevation of a directional gyroscope of the type described in copending U. S. application Ser. No. 235,546 filed October 18, 1938, for Gyroscopes, William G. Harding and Robert H. Nisbet, inventors, employing one embodiment of the present invention;

Figures 2 and 3 are front and side sectional views respectively, showing details of the application of the embodiment of the invention used in Figure 1;

Figure 4 shows diagrammatically a perspective view of another embodiment of the present invention;

Figure 5 shows a detail of the embodiment shown in Figure 4.

Figure 1:
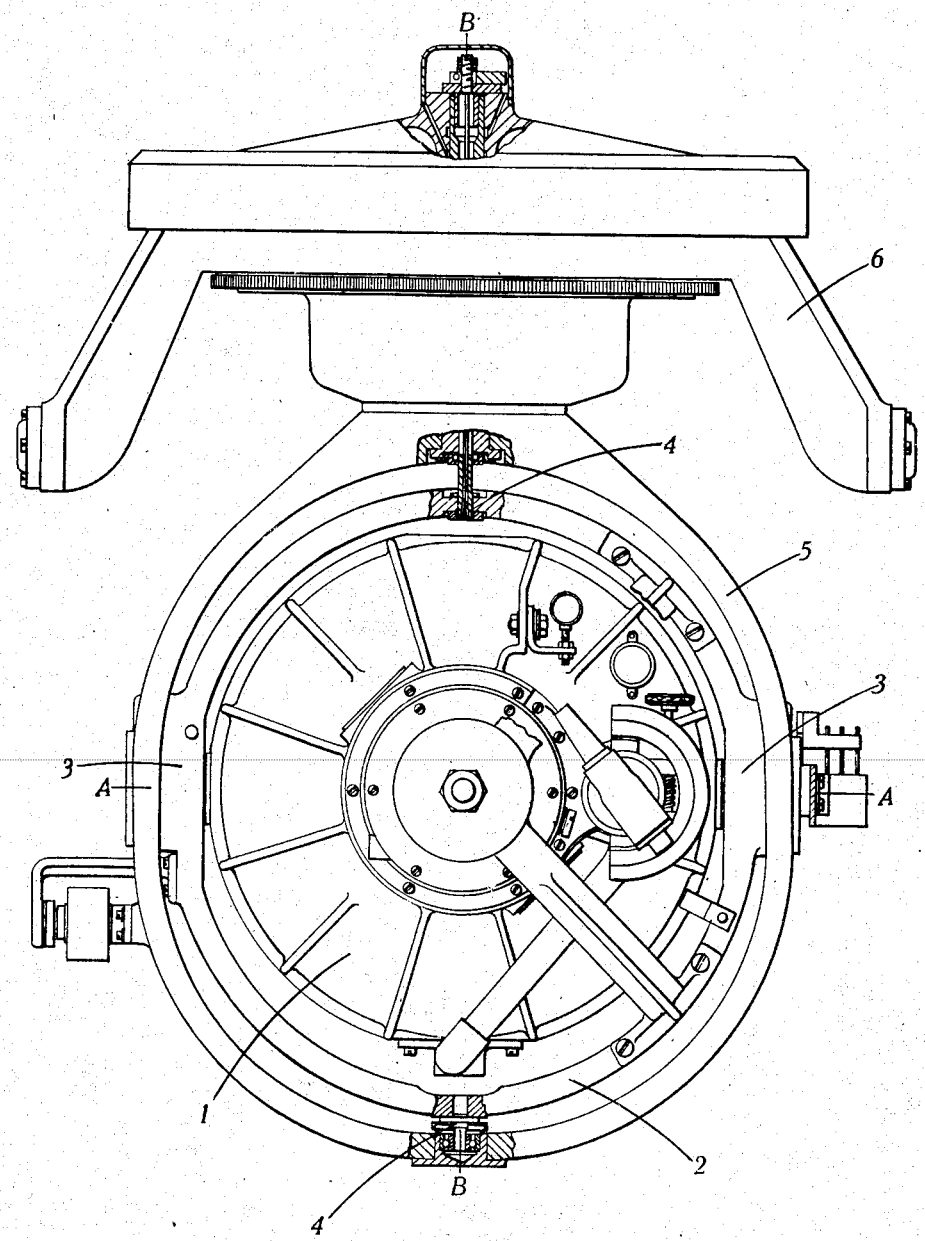

In carrying the invention into effect in one convenient manner as shown in Figures 1, 2 and 3, the rotor case 1 is carried in the Cardan or vertical ring 2 by means of bearings at 3, allowing the rotor case 1 to tilt about an axis AA. The Cardan ring 2 is supported at 4 for rotation about a vertical axis BB within a follow-up support or "phantom element" 5. This "phantom element" is carried in bearings for rotation about the axis BB in the main frame 6, the latter being universally supported in gimbals (not shown).

As seen in Figs. 2 and 3, each of the bearings 3 comprises a steel blade 7 of rectangular shape, fixed at its upper end to the block 8, which forms the head of a bolt 8" secured in the Cardan ring 2. The lower end of blade 7 is fixed to a similar block 9 on bolt 9'', secured to a projection or trunnion 10, 10' on the rotor case 1.

The blade 7 is fixed to the boltheads 8, 9, by clamps 8', 9', which are riveted to the boltheads 8, 9, by rivets 30, 30' passing through the blade.

As stated above, further constraints are provided to limit bodily movement of the rotor case 1 relatively to the Cardan ring 2. To arrange for this without restricting in any way the freedom of the rotor case to tilt about its axis of rotation AA in the Cardan ring, and yet keep the rotor case balanced about the axis AA, constitutes a problem which is not easy to solve because the axis of rotation is itself indeterminate. The rotor case 1 is free to tilt and also to move bodily relatively to the Cardan ring 2. Any particular combination of rotation and displacement is equivalent to pure rotation about an axis the position of which varies with the relative proportions of tilt and displacement. Since any horizontal line parallel to the plane of the spring blades may be an axis of rotation in certain circumstances it might appear that the axis could be arbitrarily chosen and defined by the additional constraints imposed and that the rotor case should be subsequently balanced about the axis so determined. However, in such an arrangement the additional constraints would in general have to provide forces of considerable magnitude and would therefore be liable to introduce friction or other disturbing effects. It is preferred therefore to select a definite axis by a process which determines this axis independently of the constraints, and to arrange that the constraints permit perfect freedom of movement about the axis so determined.

For this purpose all additional constraints are removed so that the rotor case is suspended solely on the two vertically hanging spring blades, and the rotor case is balanced by trial and error to satisfy the following requirements:

(1) Test for balance: there must be no tendency for the rotor case to turn in a particular direction about a horizontal axis parallel to the plane of the spring blades.
(2) Test for top-heaviness: if the rotor case is deflected from its normal position by a few degrees and released there must be no tendency for this deflection to increase in the direction of the initial deflection.
(3) Test for bottom-heaviness: the transference of a very small weight from a position on the rotor case on one side of the plane of the spring blades to a corresponding position on the other side must result in a large deflection of the rotor case from its normal position. The utmost sensitivity should be obtained in this respect, it being ensured, however, that the requirements of tests 1 and 2 are still satisfied.

When the supported body has been balanced in this way, a tilt obtained in the manner described in test 3 is a tilt produced under the action of a pure torque without transverse forces and in a state of perfect balance of the supported body about the axis of this tilt. This axis may be designated the natural axis of tilt of the supported body on the spring blade support. By careful observation and measurement it is possible to determine accurately the position of the axis about which such natural tilting takes place. If this axis passes near the original centre of gravity only small weights will have been added during the balancing process; if not, it may be advantageous to alter the location on the supported body of the points of attachment of the spring blade, and to re-balance.

In a practical form of the bearing developed for a rotor and case of a gyroscope weighing 80 lbs. it has been found that a spring blade of tempered steel, .005 inch in thickness, and having a free length of 1 inch is suitable. The position of the natural axis has been found in this particular embodiment not to be between the two blocks at all but in the lower fixing block a few thousandths of an inch below its upper surface. This does not necessarily means that the axis is below the effective point of attachment of the spring to the block, since there is probably some elastic deformation of the bolthead 9 and the clamp 9', as a result of which the spring blade may be regarded as rigidly clamped only at some distance below the upper surface of the block.

Having determined the natural axis of the suspension in this way constraints are applied which permit rotation about this axis but no other movement.

In the embodiment of the invention being described these constraints comprise ball bearings. Two pivots or trunions 11 are attached to the rotor case 1 accurately in line with the previously determined natural axis of the system, and a standard ball race 12 is mounted on each of these pivots. Each race 12 is confined in a vertical slot 13 in the supporting body 2, which slot acts as a slide bed permitting the ball race 12 to float in a vertical direction as the spring blades 7 shorten during bending. The slotted support prevents any motion in a horizontal direction perpendicular to the natural axis.

As a measure of safety a shaft 14 is provided in the Cardan ring 2, fitted with an eccentric 14' so that on suitable rotary adjustment of shaft 14 the eccentric 14' can be engaged with the bearings 12 to relieve the spring blades 7 of the weight of the rotor and rotor case.

It is found that a ball bearing mounted in this way so that it does not carry the weight of the supported body is very free from friction. Thus in the gyroscope illustrated in Figure 1 in which the rotor and rotor case weigh approximately 80 lbs. a torque of $1/100$ oz.-ins. definitely overcomes static friction. This means that the static frictional force tangential to the pivot is less than $1/25000$ of the weight of the rotor.

The pivot pins are preferably adjustable so that they can be brought absolutely into line with the natural axis of the system. It has been found, however, that when the axis of the pivots has been brought as closely as possible into coincidence with the natural axis by extremely accurate manufacture, the very slight residual errors which may remain can be rendered negligible by balancing the instrument in its completed bearings in such manner as to obtain the greatest freedom of motion in the bearings. The balance may then be very slightly different from that obtained on the spring blade alone without constraints, but the difference is so small as not to be detrimental to the operation of the instrument.

In the embodiment of the invention shown in Figures 4 and 5, the rotor case 15 is suspended by the steel blades 16, 16'. The blades 16, 16' are fixed at their upper ends to supports 17, 17', forming part of the frameworks 21, which are fixed and are connected on the vertical Cardan ring (not shown), while the springs are connected at their lower ends to shafts 18, 18' which are solid with shafts 19, 19' respectively. The coaxial shafts 19, 19' are fixed to the rotor case 15 and their common axis is the horizontal axis about which the rotor case tilts during the normally small precessional tilts of the gyroscope. The shafts 18, 18' project eccentrically from the ends of the shafts 19, 19' and are of cylindrical form, having their axes parallel to and in horizontally staggered relationship with the axis of the shafts 19, 19', i. e. the axis of tilt of the rotor case. These shafts 18, 18' are arranged so that the axis of tilt lies along their surfaces as clearly seen from Figure 5. When the rotor case 15 tilts, one of the shafts 18, 18' winds itself to a greater extent in its respective blade, while the other of these two shafts unwinds itself from the other blade to an equal extent, so that the centre of gravity of the rotor and rotor case is maintained at a constant height.

In this embodiment the constraints for preventing movement of the rotor case other than tilt comprise stretched horizontal wires or blades interconnecting the supported and supporting bodies. Such constraint wires are shown at 20a, 20b, 20'a, 20'b, each wire being attached at one end to the supporting framework 21 and secured at its other end to one of the crank-like arms 22, 22', which are rigidly attached to the shafts 18 and 18' respectively.

The U-shaped members shown at 23, 23', which are normally out of contact with the shafts 19, 19', are provided as safety devices in case of fracture of the blades 16, 16'.

It should be understood that the invention is not restricted solely to details of the forms described above since various modifications may be introduced as they become desirable in order to carry the invention into effect under different conditions and requirements which have to be fulfilled, without departing from the scope of the invention.

What we claim is:

1. In a substantially horizontal trunnion bearing for sensitive members, a supporting member, a sensitive member, a trunnion on one of said members, a normally vertical leaf spring extending between the other member and the trunnion for suspending the weight of the sensitive member but permitting limited pivotal movement thereof about a predetermined horizontal axis, and separate means for preventing translatory movement of said trunnion with respect to said other member without opposing its pivotal movement.

2. In a horizontal bearing for sensitive members, a supporting member, a sensitive member, normally vertical leaf springs between said members on opposite sides thereof to suspend the weight of the sensitive member from the supporting member but permitting limited tilt thereof, and additional means for preventing relative lateral movement of said members without interfering with the natural horizontal position of the natural axis of tilt of said sensitive member.

3. In a horizontal bearing for sensitive members, a supporting member, a sensitive member, normally vertical leaf springs between said members on opposite sides thereof to suspend the weight of the sensitive member from the supporting member but permitting limited tilt thereof about a predetermined axis of tilt, said leaf springs being clamped to the sensitive member along a line coinciding substantially with said axis of tilt, and additional means for preventing lateral movement of said axis of tilt relative to said supporting member.

4. In a horizontal bearing for sensitive members, a supporting member, a sensitive member, normally vertical leaf springs between said members on opposite sides thereof to suspend the weight of the sensitive member from the supporting member but permitting limited tilt thereof about a predetermined axis of tilt, and horizontal wires stretched between the supporting member and the sensitive member at right angles to the axis of tilt for preventing lateral movement of said axis of tilt relative to said supporting member.

5. In a horizontal bearing for sensitive members, a supporting member, a sensitive member, normally vertical leaf springs between said members on opposite sides thereof to suspend the weight of the sensitive member from the supporting member but permitting limited tilt thereof about a predetermined axis of tilt, said leaf springs being wrapped around curved portions of said sensitive member and attached thereto, so that the lines of contact of said leaf springs with said sensitive member coincide with said axis of tilt, and additional means for preventing lateral movement of said axis of tilt relative to said supporting member.

6. In a horizontal bearing for sensitive members, a supporting member, a sensitive member, normally vertical leaf springs between said members on opposite sides thereof to suspend the weight of the sensitive member from the supporting member but permitting limited tilt thereof about a predetermined axis of tilt, said leaf springs being wrapped around curved portions of said sensitive member and attached thereto, so that the lines of contact of said leaf springs with said sensitive member coincide with said axis of tilt, one leaf spring being wrapped clockwise around the sensitive member and another leaf spring being wrapped counter-clockwise around the sensitive member, so that a tilt of the sensitive member will not change the position of its center of mass, and additional means for preventing lateral movement of said axis of tilt relative to said supporting member.

7. In a horizontal bearing for sensitive members, a supporting member, a sensitive member, normally vertical leaf springs between said members on opposite sides thereof to suspend the weight of the sensitive member from the supporting member but permitting limited tilt thereof, and additional anti-friction bearings between said members, which are ineffective only against up and down relative movement.

8. In a substantially horizontal trunnion bearing for sensitive members, a supporting member, a sensitive member, a trunnion on one of said members, a normally vertical leaf spring extending between the other member and the trunnion for suspending the weight of the sensitive member but permitting limited tilt thereof, a ball bearing for said trunnion, and means for slidably supporting said bearing permitting up and down movement only.

9. In a substantially horizontal trunnion bearing for sensitive members, a supporting member, a sensitive member, a trunnion on one of said members, a normally vertical leaf spring extending between the other member and the trunnion for suspending the weight of the sensitive member but permitting limited tilt thereof, eccentric portions on said trunnion, and oppositely extending horizontal wires extending between each portion and the support for preventing lateral movement of the trunnion.

10. In a substantially horizontal trunnion bearing for sensitive members, a supporting member, a sensitive member, a trunnion on one of said members, a normally vertical leaf spring extending between the other member and the trunnion for suspending the weight of the sensitive member but permitting limited pivotal movement thereof about a predetermined horizontal axis, and a floating guide bearing for said trunnion for preventing translating movement thereof with respect to said other member without opposing its pivotal movement or supporting its weight.

HUGH MURTAGH.
WILLIAM GEORGE HARDING.